United States Patent
Liedtke et al.

(10) Patent No.: US 11,314,070 B2
(45) Date of Patent: Apr. 26, 2022

(54) MICROSCOPE SYSTEM AND METHOD FOR TIME CONTROLLING PROCESSES IN A MICROSCOPE SYSTEM

(71) Applicant: Carl Zeiss Microscopy GmbH, Jena (DE)

(72) Inventors: Mirko Liedtke, Jena (DE); Andreas Kühm, Dornburg-Camburg (DE); Nico Presser, Jena (DE); Burkhard Roscher, Jena (DE); Christian Kämmer, Saalfeld (DE)

(73) Assignee: Carl Zeiss Microscopy GmbH, Jena (DE)

( * ) Notice: Subject to any disclaimer, the term of this patent is extended or adjusted under 35 U.S.C. 154(b) by 277 days.

(21) Appl. No.: 16/610,009

(22) PCT Filed: Apr. 30, 2018

(86) PCT No.: PCT/EP2018/061014
§ 371 (c)(1),
(2) Date: Oct. 31, 2019

(87) PCT Pub. No.: WO2018/202613
PCT Pub. Date: Nov. 8, 2018

(65) Prior Publication Data
US 2020/0073102 A1    Mar. 5, 2020

(30) Foreign Application Priority Data
May 3, 2017 (DE) .......................... 102017109455.5

(51) Int. Cl.
*G02B 21/00* (2006.01)
*G06F 1/10* (2006.01)

(52) U.S. Cl.
CPC ............. *G02B 21/008* (2013.01); *G06F 1/10* (2013.01)

(58) Field of Classification Search
CPC ..... G06F 1/10; G06F 1/04; G06F 1/06; G06F 1/08; G06F 1/12; G06F 1/14;
(Continued)

(56) References Cited

U.S. PATENT DOCUMENTS

| 4,503,490 A | 3/1985 | Thompson |
| 5,452,436 A * | 9/1995 | Arai .......................... G06F 1/10 713/375 |

(Continued)

FOREIGN PATENT DOCUMENTS

| DE | 10039248 A1 | 2/2002 |
| DE | 102012216002 B3 | 9/2013 |

(Continued)

OTHER PUBLICATIONS

International Search Report with English Translation dated Aug. 22, 2018.
German Search Report dated Dec. 15, 2017.

*Primary Examiner* — John W Poos
(74) *Attorney, Agent, or Firm* — Duane Morris LLP

(57) ABSTRACT

A method for timing procedures in a microscope system, which has a plurality of microscope modules configured to carry out various processes, provision is made for a clock signal to be provided to all microscope modules by a central clock generator and for the clock signal to be modulated by a clock modulation circuit in order to produce a defined clock-pulse number. The microscope modules define a start time for carrying out a process by way of the clock-pulse number, carrying out the process as soon as the clock-pulse number is reached. Moreover, a corresponding microscope system is described.

12 Claims, 3 Drawing Sheets

(58) Field of Classification Search
CPC .... G02B 21/008; G02B 21/002; H03K 5/135; H03K 23/42; H03L 7/07
See application file for complete search history.

(56) References Cited

U.S. PATENT DOCUMENTS

| | | |
|---|---|---|
| 2001/0015411 A1 | 8/2001 | Ohdaira et al. |
| 2015/0241681 A1 | 8/2015 | Hara et al. |
| 2016/0179129 A1 | 6/2016 | Kim et al. |
| 2019/0137746 A1* | 5/2019 | Yabugaki ............. G02B 21/008 |
| 2020/0201010 A1* | 6/2020 | Liedtke ................ G02B 21/008 |

FOREIGN PATENT DOCUMENTS

| | | | |
|---|---|---|---|
| DE | 102011055639 B4 | 2/2016 | |
| EP | 2665184 B1 | 9/2015 | |
| WO | WO-2004006302 A2 * | 1/2004 | ............. G01Q 10/06 |
| WO | 2005106561 A1 | 11/2005 | |
| WO | 2006023427 A2 | 3/2006 | |

* cited by examiner

MICROSCOPE SYSTEM AND METHOD FOR TIME CONTROLLING PROCESSES IN A MICROSCOPE SYSTEM

RELATED APPLICATIONS

The present application is a U.S. National Stage application of International PCT Application No. PCT/EP2018/061014 filed on Apr. 30, 2018 which claims priority benefit of German Application No. DE 10 2017 109 455.5 filed on May 3, 2017, the contents of each are incorporated by reference in their entirety.

FIELD OF THE INVENTION

The present invention relates in a first aspect to a method for timing procedures in a microscope system.

In a second aspect, the invention relates to a microscope system.

BACKGROUND OF THE INVENTION

In a generic method for timing procedures in a microscope system, various processes are carried out by a plurality of microscope modules that are configured to carry out the various processes.

Correspondingly, a generic microscope system has a plurality of microscope modules that are configured to carry out various processes.

Microscope systems, for example laser scanning microscopes, are distributed systems that have a plurality of modules (referred to as microscope modules below). Great demands are placed on the data transfer between the modules. In particular, a bandwidth of the transfer should be as high as possible, the transfer quality should be as good as possible and a latency of the transfer should be as low as possible.

The ever-increasing demands on the transfer rate and temporal accuracy cannot be met in satisfactory fashion by known microscope systems, particularly if the employed pixel clocks are particularly short.

The individual modules usually have a dedicated clock generator. The latter operates independently of the clock generators of other modules. As a rule, a synchronization signal is used for communication between the modules. Should the modules receive the synchronization signal, this time is labelled and can be used for a synchronous procedure. By way of example, a module can transmit data as soon as it receives a synchronization signal. However, the arrival of a synchronization signal cannot be sensibly predicted by a module. Therefore, the module must prepare data to be transmitted and thereupon wait for a synchronization signal to be received. Relatively long unused time periods arise as a result.

These problems of the prior art are explained in more detail with reference to FIG. 1. FIG. 1 plots the duration 1, which labels a pixel length 1, along the horizontal time axis t. The pixel length 1 may represent a duration within which the microscope system should record a sample point (a pixel). To this end, scanning mirrors must be set on the sample point in the case of a scanning microscope. To this end, the actuation signals must be transferred to the scanning mirror within the pixel length. A start time 0, at which the pixel length starts, can be predetermined by a synchronization signal. Ideally, the appropriate microscope modules should generate the actuation signals for the scanning mirrors, and forward said signals to the latter, from this time. However, transfer delays and calculation durations, which cause a delay 2, arise in the process. Only the part of the pixel length 1 remaining after the delay 2 can be used for the signals 3. The pixel length 1 should be as short as possible in order to generate frame recordings that are as fast as possible. However, very short pixel lengths 1 have not been possible previously as a result of the delay 2.

By way of example, a conventional microscope system is described in DE 10 2011 055 639 B4. Here, a synchronizer is used, the latter synchronizing the data of the various modules as presented in paragraph [0087] of this document, in particular.

SUMMARY OF THE INVENTION

An object of the invention is to provide a microscope system and a method for operating a microscope system, which efficiently coordinate processes of microscope modules of the microscope system to be carried out and which facilitate efficient communication between the microscope modules.

This object is achieved by a method having the features of the method claims annexed hereto and by means of a microscope system having the features of the microscope system claims annexed hereto.

Advantageous variants of the method and microscope system according to the invention are subjects of the dependent claims and will be explained in the description that follows.

In the aforementioned method, a clock signal is provided for all microscope modules by a central clock generator. Before the clock signal is transmitted to the microscope modules, the clock signal is modulated by a clock modulation circuit in order to produce a defined clock-pulse number. That is to say, the clock signal has a base frequency that specifies a clock with a constant frequency and a clock-pulse number information item is additionally modulated therein. This clock-pulse number information item renders clock pulses transmitted in succession distinguishable. Consequently, the microscope modules can not only determine the time of a clock pulse; rather, the microscope modules also know which clock pulse this relates to. The microscope modules now define a start time for carrying out a process by way of the clock-pulse number and carry out the process as soon as the clock-pulse number is reached.

Accordingly, the microscope system of the aforementioned type additionally includes a central clock generator, which is configured to output a clock signal to the microscope modules. The microscope system also has a clock modulation circuit, which is configured to modulate the clock signal for producing a defined clock-pulse number. The microscope modules are configured to define a start time for carrying out a process by way of the clock-pulse number and carry out the process as soon as the clock-pulse number is reached.

A future end time for such a process can be defined if the expected duration of carrying out the process by the module and an associated line delay to or from the module are known. Knowledge of the future end time can thereupon be used to plan or carry out other processes in a manner dependent thereon.

Advantageously, the microscope modules can set a start time for future processes, with the time relationship between processes of various microscope modules being known. A central clock generator is necessary to this end because each module would otherwise have a dedicated local clock, the relationships between these then being unknown. In this case of the prior art, the various modules would not run synchronously and the various local clocks would be matched to one another only briefly at a time at which a synchronization signal is received by the modules. By contrast, the various modules always run synchronously with a known relationship with respect to one another in the invention as a result of the central clock generator. The modules being able to distinguish different clock pulses of the clock signal is furthermore important in this context. Not all clock pulses need be distinguishable from one another; rather, it is sufficient for a labelled clock pulse to be implemented after a certain number of clock pulses, with the labelled clock pulses differing from one another.

By way of example, the clock signal can be a digital signal with, alternately, a high signal level and a low signal level. The base frequency of the clock signal can be determined by the time interval between rising pulse edges (i.e., the transition from the low to the high signal level). A clock-pulse number information item can now be modulated into the clock signal by virtue of varying the times of the falling pulse edges. The times from a rising pulse edge to a falling pulse edge may be a variable percentage of the overall duration between two successive rising pulse edges, for example 10%, 20%, 30%, etc. Such variable times may always be used after a certain number of clock pulses with a fixed duration between rising and falling pulse edge, for example for every fifth falling pulse edge. Naturally, it is also possible to use the falling pulse edges for the base frequency of the clock signal and vary the times for the rising pulse edges.

Alternatively, the clock signal can also be modulated by way of an amplitude modulation. While this is easier to implement, it may influence the quality under certain circumstances. Therefore, as described above, it is preferable for the clock modulation circuit to be configured to modulate a clock signal by virtue of varying a distance between rising clock pulse edges while leaving a distance between falling clock pulse edges constant. Alternatively, the clock modulation circuit modulates a distance between falling clock pulse edges while leaving a distance between rising clock pulse edges constant. Thereupon, the clock frequency/base frequency can be extracted from the pulse edges with a constant distance, while the variable pulse edge distance encodes an information item. This information transfer does not influence the quality of the clock. In particular, there is no, or hardly any, jitter and noise of the clock signal remains uninfluenced.

By way of example, the clock-pulse number information item can label a 1st clock pulse. The modules count all clock pulses following the latter. As a result, a module can start a process planned for the future in good time. By way of example, if a module should transmit a control command at the 20th clock pulse and the module requires 12 clock pulses to calculate the control command, the module starts the calculation procedure at the 8th clock pulse. Decisive time advantages are obtained as a result thereof. Herein lies a substantial difference to synchronization according to the prior art: In the latter, a module cannot predict when it will receive a synchronization signal and therefore cannot ascertain in advance when it should start the calculation procedure. Following a synchronization signal, the modules in the prior art continue to work independently of one another, i.e., asynchronously; as a result, a synchronization signal does not provide a meaningful option for starting a calculation procedure after e.g. 8 clock pulses and then emitting a control command that another module would receive at a defined clock time.

Conventional systems with a common clock only use this signal for synchronizing their processes. For operation, calculation or process-clocking purposes, they each use a dedicated, faster clock. These two clock domains, i.e., the faster clock and the common clock, are asynchronous with respect to one another most of the time and only equalized occasionally, a disadvantageous jitter occurring in the process.

Preferably, the clock signal of the central clock generator is also used to transmit further information in addition to transmitting a uniform clock and a clock-pulse number information item. Thus, the clock modulation circuit is preferably configured to modulate a clock signal from the clock generator in order to encode an additional information item. The clock generator and the clock modulation circuit may also be formed by a common electronic circuit. The clock input circuit of each microscope module can be configured to read an information item encoded into the clock signal. This information item can be any data stream, for example a control information item for the microscope modules, for instance a reset command or a global asynchronous reset command, a handshake signal, an alarm or start and end points of a module operation. Advantageously, this allows data to be transferred in the clock signal without the data lines having to be used to this end. Information items for a synchronization can also be encoded and transmitted in the clock signal.

While the central clock for communication between the microscope modules is uniform, a different clock frequency can be used within a microscope module. In particular, the internal clock frequency of one microscope module can be different from the internal clock frequency of another microscope module. To this end, at least one of the microscope modules can be configured to form a clock with a different frequency from the received clock signal and use this clock as a local module clock, i.e., as an internal clock frequency. Thus, the received clock signal can be divided into a lower frequency which is then used as local module clock. By way of example, this is often expedient in order to operate cost-effective components, e.g., FPGAs, at a lower frequency. Depending on the type of the employed FPGA, the modules can operate with clock frequencies that have been lowered to different extents. By contrast, a higher local module clock, which may also be higher than the central clock, can be generated for microscope modules with high-performance components. Expressed differently, different microscope modules can be configured to form different clocks from the clock signal received in each case and use said clocks as local module clock in each case. These different clocks have the same phase, even if they differ in terms of frequency. Herein lies a decisive difference in relation to conventional microscope systems. By virtue of microscope modules being configured to use the clock signal of the central clock generator or a clock derived therefrom as an internal clock, all microscope modules can advantageously be synchronous down to a single vibration period. Consequently, high data transfer speeds with a good signal quality become possible.

A microscope module need not use a single, uniform clock frequency for its processes. Rather, at least one of the microscope modules may possibly derive different clock regimes, which differ in terms of their clock frequency, from the local module clock. The corresponding microscope module now carries out different processes under the different clock regimes. That is to say, a first process is carried out under a first clock regime and a second process is carried out under a second clocked regime. A clock regime should be understood to mean a specific clock. The clock regimes differ in terms of their base frequency. Consequently, the module can prescribe a suitable clock regime depending on the electronic circuit.

The different microscope modules can work with different local module clocks but derive the same clock regime from the different local module clocks, one or more processes being carried out under said same clock regime by said microscope modules in each case. As a result, processes of different modules can easily interact without the modules otherwise requiring the same local module clock.

In principle, all clock regimes can be derived directly from the local module clock. However, alternatively, at least one of the microscope modules can derive at least one clock regime, under which it carries out a process, from its local module clock, and derive a clock sub-regime from the clock regime, said microscope module carrying out a further process under said clock sub-regime. Consequently, the clock sub-regime is formed from a clock regime and moreover also has a precise relationship with the local module clock and the clock signal of the central clock generator.

At least one of the microscope modules can be configured to synchronize one of its clock sub-regimes with one of its clock regimes after a certain running time. The synchronization is therefore implemented directly with respect to a clock regime and not with respect to the local module clock or the clock signal of the central clock generator. This can advantageously reduce the complexity for carrying out a process. Likewise, a clock regime can advantageously be synchronized with respect to the local module clock without sub-regimes dependent on this clock regime having to be modified.

At least one microscope module can also be configured to set, with the aid of the clock-pulse number contained in the clock signal, times at which various clock regimes are activated and deactivated. Here, the clock regimes can overlap in time and can have different start times and stop times from one another. Each clock regime may receive an identifier, i.e., an identification, which is released again once this clock regime has been worked through (i.e., when the stop time is reached or, if no stop time is set in advance, when the processes belonging to the clock regime are completed) and which can be used for a new clock regime.

A plurality of microscope modules may be connected in series, in particular for simple wiring. For a simpler understanding, an example is described below, in which at least a first and a second microscope module of the plurality of microscope modules are connected in series. The central clock generator transmits the clock signal to the first microscope module. The latter passes the clock signal to the second microscope module. As a result, the first and the second microscope module do not receive the clock signal at the same time but receive these in succession with a time offset. Such a time offset is problematic for the embodiment described above, in which a clock-pulse number information item is transferred, by means of which all modules should be able to identify a certain time (i.e., the same clock pulse number). By way of example, a time offset between the first and second module can be approximately three clock pulses. Now, when the second module receives the clock-pulse number information item specifying the 1st clock pulse, the first module has already continued counting by three clock pulses. In order to take account of such a time offset, the first and/or second microscope module can include a data memory in which a predetermined time offset value is stored, the latter serving as a measure for the time offset. The time offset value may have been calculated or measured in advance and it is securely stored in one of the modules. In order to take account of the time offset, the first and/or second microscope module can now be configured to change a clock-pulse number corresponding to the clock-pulse number information item by the time offset value (or a variable derived therefrom). In the aforementioned example with a time offset value corresponding to three clock pulses, the first module would reduce the clock-pulse number corresponding to the clock-pulse number information item by three. Specifically, if it receives the clock-pulse number information item specifying the 1st clock pulse, it would derive therefrom that the −2nd clock pulse is present. Three clock pulses later, the clock-pulse number in both modules is one. Consequently, the first and second module count the same clock-pulse number at all times. If a module should carry out a certain process at a certain clock-pulse number, the clock-pulse number advantageously corresponds in all affected modules. By way of example, if a module should transmit a control command to another module at the 50th clock-pulse number, the 50th clock-pulse number corresponds to the same time in both modules.

Advantages of the invention will be described below in comparison with FIG. 1. In the case of a conventional transfer according to FIG. 1, a synchronization signal has to be awaited, the latter arriving at a time that is not known to a microscope module. Transfers and possible calculations can only be undertaken after this time, resulting in a delay that cannot be used for the actual data transfer, such as the data for the scanning mirror actuation that must arrive within the pixel length 1 in the example of FIG. 1. Unused delays can be avoided in the invention by using the common clock for all microscope modules: As a result of this, it is possible to predict times lying in the future and procedures can be carried out fittingly therewith. Thus, calculation durations and transfer delays can be taken into account, and so a microscope module transmits the actuation data for the scanning mirrors, for example, sufficiently timely such that these arrive at the module of the scanning mirrors at the start of the pixel length 1 and not only after the delay 2. Consequently, the central clock generator of the invention allows a faster and more efficient communication between the microscope modules.

A plurality of microscope modules can be disposed in succession on a bus. In particular, not every microscope module is directly supplied with the clock signal by the central clock generator in said case. Rather, the clock signal is forwarded from one microscope module to the next. At least some of the microscope modules may have a clock input circuit and a clock output circuit for the purposes of forwarding the clock signal. The clock signal is receivable by way of the clock input circuit and the clock signal can be output, more particularly in processed form, to another one of the microscope modules by way of the clock output circuit. To this end, the clock input circuit can be configured to condition the received clock signal and only then output the latter by way of the clock output circuit. By way of example, amplifiers and/or filters can be used for conditioning purposes.

The clock input circuit or a circuit following the latter can expediently be configured to extract a carrier frequency of the clock signal, in particular by way of a phase-locked loop (PLL). By way of example, the carrier frequency can be ascertained only by way of the rising pulse edges or falling pulse edges of the clock signal.

The feature of a microscope module using the clock signal as an internal clock can be understood to the effect of the internal clock being adapted in terms of its frequency and phase angle in such a way that it corresponds to the carrier frequency of the clock signal. The feature of the microscope module using a clock derived from the clock signal as internal clock can be understood to the effect of the internal clock being adapted to a certain frequency ratio and, in particular, a certain phase angle relative to the internal clock, for example to a quarter of this frequency.

In principle, the microscope modules can be any component of a microscope with electronic component parts or any electronic component that interacts with a microscope. By way of example, at least some of the microscope modules can be chosen from the following group of microscope modules: a laser scanning module, a spectrometer module, a multiphoton examination module, a filter control module which, e.g., introduces a light filter into a beam path or removes said light filter from the latter, a frame recording module which may have, e.g., one or more cameras or light detectors, a light source module for emitting light or a visualization module which may include a monitor.

The properties of the invention described as additional apparatus features are also to be interpreted to be variants of the method according to the invention, and vice versa. In particular, the method variants arise by the use as intended of the described properties of the microscope system.

In principle, any electronic circuit that produces an oscillation at a certain, generally constant frequency can be considered to be a clock generator. The modulation circuit and the clock generator can be formed by a common electronic circuit or else be formed in a manner spatially separated from one another.

BRIEF DESCRIPTION OF THE DRAWINGS

Further advantages and features of the invention will be described below with reference to the appended schematic figures. In the figures.

Identical and identically acting constituent parts are generally identified by the same reference signs in the figures.

DETAILED DESCRIPTION OF EMBODIMENTS OF THE INVENTION

Figure 1:
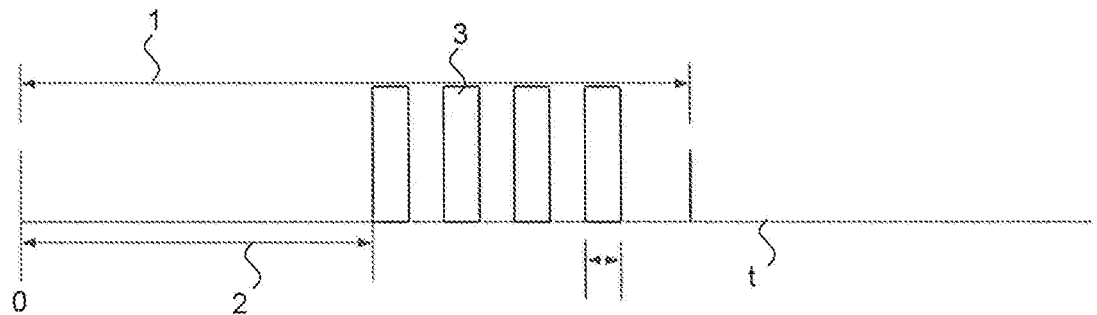
FIG. 1 is a schematic illustration of a delay-afflicted data transfer between modules of a microscope of the prior art.
Figure 2:
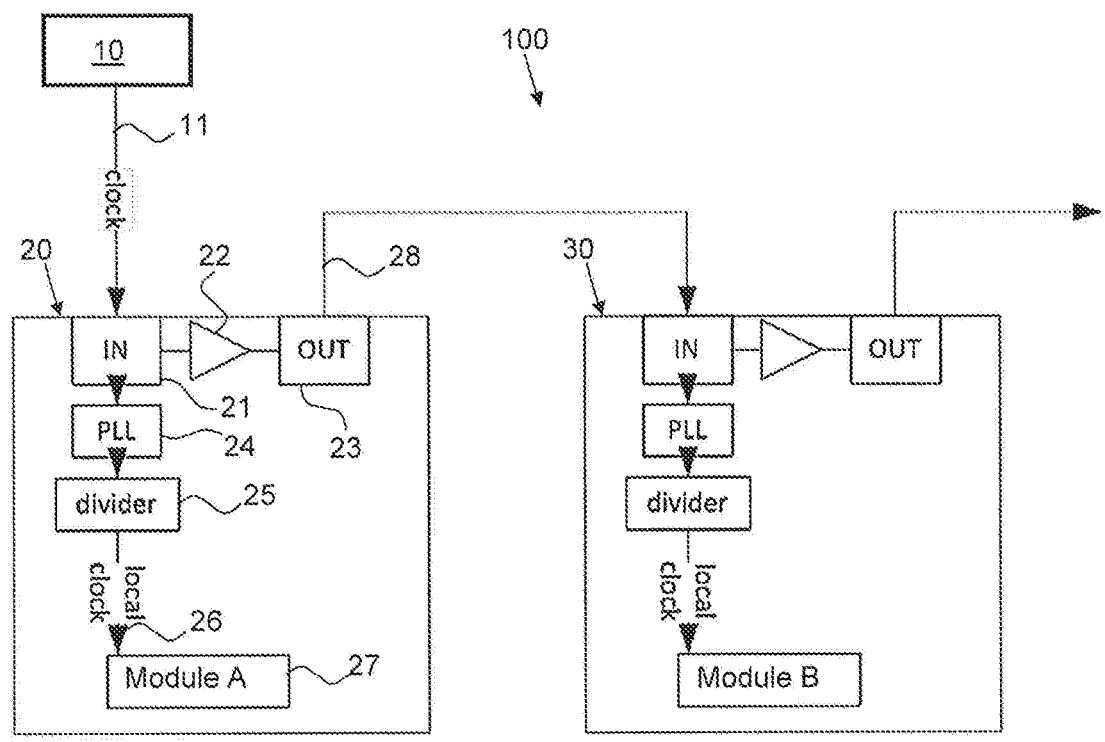
FIG. 2 is a schematic illustration of a microscope system according to the invention.

FIG. 2 illustrates an exemplary embodiment of a microscope system 100 according to the invention. As essential components, the latter has a plurality of microscope modules 20, 30 and a central clock generator 10.

In principle, the microscope modules 20, 30 can be any constituent parts of a light microscope that has electronic components. By way of example, the module 20 can be a laser scanning unit and the module 30 can be a light source unit which includes a plurality of lasers and the actuation unit thereof, for example.

The modules 20, 30 communicate with one another and/or with a central computing unit (not illustrated). Data communication times must be synchronized with one another. By way of example, scanning mirrors of one module and a light source of another module should be actuated in a manner synchronized in time with one another.

In the prior art, these modules operate at asynchronous clock frequencies that are independent of one another. Therefore, it is difficult to synchronize in time future processes with respect to one another. Synchronization signals that are transmitted to the modules are frequently used. By way of example, a synchronization signal can be a rising pulse edge in a signal. Should the modules receive a synchronization signal, they can identify the time of reception as a commonly known time. Processes can now be carried out simultaneously. However, future processes cannot be planned precisely because the various modules continue to run independently of one another in asynchronous fashion again following the reception of the synchronization signal.

This is avoided in the modules 20, 30 of the microscope system 100 according to the invention. To this end, a uniform clock generated by the central clock generator 10 is used. The latter outputs a clock signal 11 that is guided to all microscope modules 20, 30.

In the illustrated example, the clock generator 10 transmits the clock signal 11 to the first module 20, which forwards the clock signal to the second module 30.

The module 20 has a clock input circuit 21, by means of which an incoming clock signal 11 is received. By way of an amplifier circuit 22, which may also be considered to be part of the clock input circuit 21, the clock signal 11 is amplified and output via a clock output circuit 23 on a line 28 to the next module 30.

From the clock input circuit 21, the clock signal 11 is moreover provided to a frequency ascertainment circuit 24, for example a phase-locked loop 24, which determines a carrier frequency of the clock signal 11. The frequency ascertainment circuit 24 can also be considered to be part of the clock input circuit 21.

Furthermore, the module 20 has a clock divider circuit 25, which can derive another clock from the carrier frequency of the clock signal 11, for example a clock at half the frequency of the carrier frequency of the clock signal 11. This derived clock is used as an internal clock 26 or module clock 26 for components 27 of the module 20. By way of example, the components 27 may have an FPGA. The clock divider circuit 25 is designed such that its output clock 26 is suitable for the FPGA of this module.

The module 30 has the same form as the module 20 and differs from the latter in terms of the design of the components 27. Depending on the type of components 27, the clock divider circuit of the module 30 can have a different embodiment to the clock divider circuit of the module 20 such that the modules 20, 30 output different internal clocks. However, these internal clocks have a known relationship to one another because both are derived from the same clock signal 11 of the central clock generator 10.

The clock signal 11 is also used for data transfer. To this end, a data stream is modulated into the clock signal 11. This is described in more detail with reference to FIG. 3, which shows the clock signal 11 in the uppermost row. The second row shows a modulated clock signal 12. Here, the times of the falling pulse edges of the clock signal are modulated to transfer information items. A case is illustrated in which the falling pulse edge of the first clock pulse on the left side of the figure is delayed to 90% of the time duration between two rising pulse edges. The time of the falling pulse edge is interpreted as an information item by a module 20, 30. At least, such information items contain a clock-pulse number information item, as a result of which different clock pulses are distinguishable from one another. Moreover, additional information can be transmitted by the times of the falling pulse edges, for instance control commands, for example as a reset command or as a reset of the clock-pulse count to zero, for example.

By contrast, the rising pulse edges have a constant time spacing in the modulated clock signal 12, and so the carrier frequency or base frequency can be ascertained therefrom.

Figure 3:
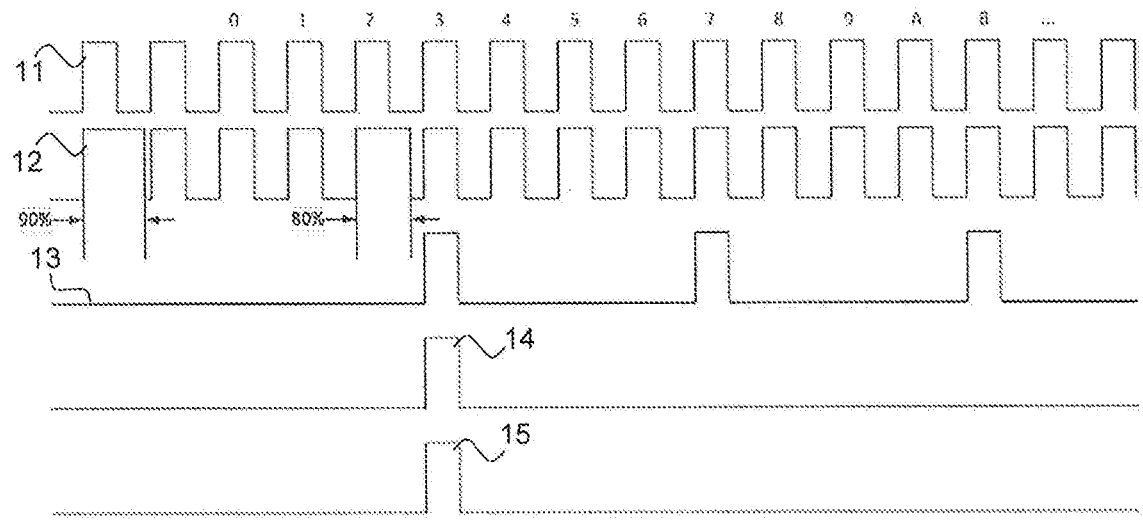
FIG. 3 is a schematic illustration of clock signals between and within the microscope modules of the microscope system of FIG. 2.

The signal 13 of the third row of FIG. 3 specifies a clock derived from the clock signal 11 or 12, the frequency of which clock corresponds to ¼ of the frequency of the clock signal 11. By way of example, this can correspond to the duration of the frame recording of a pixel. The signal 14 of the next row has a frequency smaller than that of the clock signal 11 by a factor of 128. Because only the time of a rising pulse edge is evaluated for the illustrated example (and hence the duration of the high or low level is not relevant), the high level of the signal 14 is not, for instance, maintained for a time that is longer by a factor of 128; however, the next time at which a rising pulse edge or no rising pulse edge is present for information encoding purposes only follows after 128 clock pulses (i.e., after 128 rising pulse edges of the clock signal 11). By way of example, the signal 14 can correspond to the duration of a frame recording of a line. By contrast, the signal 15 of the bottom row of FIG. 3 should represent the duration of the frame recording of an entire frame and may equal 65 536 clock pulses, for example. Since, once again, only the question of whether a rising pulse edge is present is relevant and the duration of a high level is not relevant, only a short pulse, once again, is used in the illustrated example.

A future process can be precisely controlled in time by virtue of the time duration of a process being able to be counted in clock pulses (for example 65 536 clock pulses for recording a frame). By way of example, change commands for the light source can always be transmitted to the light source module after 65 536 clock pulses.

Figure 4:
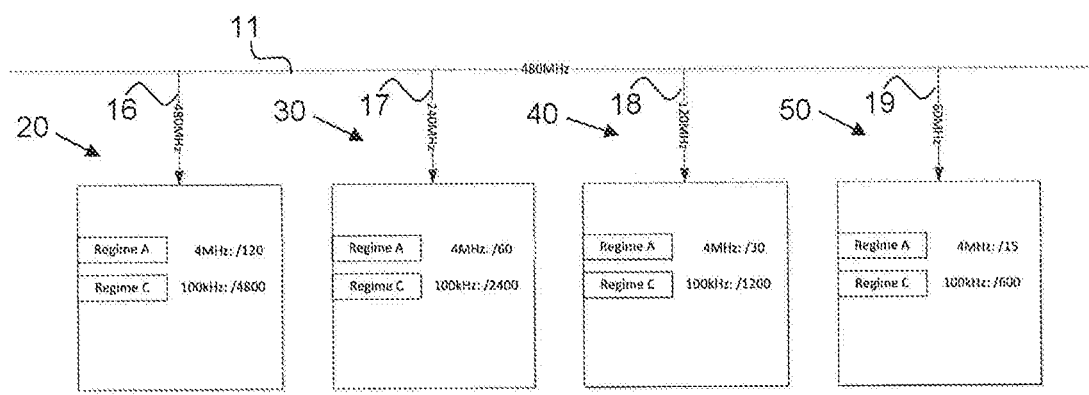
FIG. 4 is a schematic illustration of how microscope modules derive different local module clocks and clock regimes from the clock signal.

The use of the clock signal 11 of the central clock generator by the individual modules will now be described in more detail with reference to FIG. 4. The clock signal 11 at 480 MHz, for example, is provided to the microscope modules 20, 30, 40 and 50. From this, the microscope module 20 forms a local module clock 16. The local module clock 16 may have a different base frequency than the clock signal 11; in the illustrated example, the local module clock 16 has the same frequency as the clock signal 11. By contrast, the microscope module 30 forms a local module clock 17 from the clock signal 11, the frequency of said local module clock differing from the clock signal 11 and being 240 MHz, for example. Accordingly, the microscope modules 40 and 50 form local module clocks 18 and 19 at different frequencies; these are 120 MHz and 60 MHz in the illustrated example. Such different local module clocks 16-19 are expedient if, for example, qualitatively different components are used in the modules 16-19, said components working best at different frequencies.

The modules 20, 30, 40, 50 form different clock regimes from the local module clock. In the illustrated example, a plurality of the modules 20, 30, 40, 50 each form a clock regime A and a clock regime C. The clock regime A has a certain base frequency, 4 MHz in the example, and is formed by the modules 20, 30, 40, 50 despite their different local module clocks. Here, as specified in FIG. 4, 120 clock pulses of the local module clock 16 correspond to clock regime A in the module 20. By contrast, 60 clock pulses of the local module clock 17 correspond to clock regime A in the module 30. Clock regime C has a different clock frequency, 100 kHz in the illustrated example, to that of clock regime A. FIG. 4 once again specifies how many clock pulses of the local module clock 16-19 correspond to one clock pulse of clock regime C. Preferably, the clock signal 11 is divided into the local module clocks 16-19 in such a way that the clock signal 11 in each case is an integer multiple of each of the local module clocks 16-19. Equally, the division of the local module clocks 16-19 into the clock regimes is such that the respective local module clock 16-19 is an integer multiple of each of the clock regimes in each case. This ensures that clock pulses of all clock regimes always correspond with a clock pulse of the clock signal and of the respective local module clock, rendering communication and synchronizations easily possible.

Figure 5:
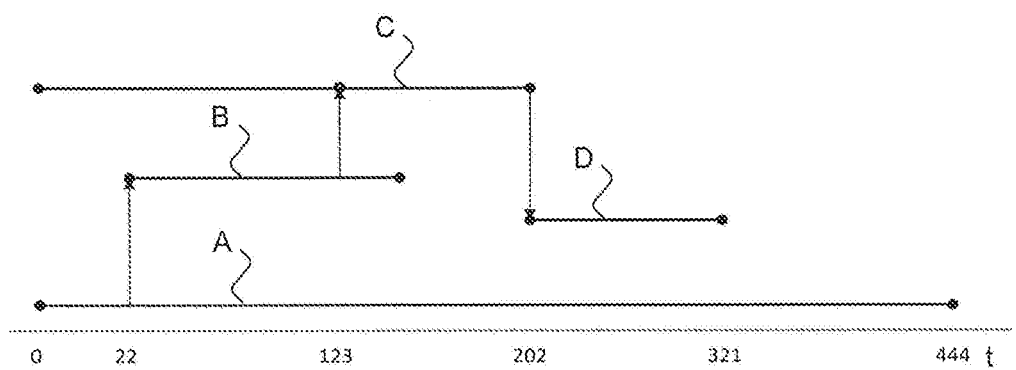
FIG. 5 is a schematic illustration of how clock regime and clock sub-regime are activated and deactivated by a microscope module.

The two clock regimes A and C can each be derived from the respective local module clock 16-19. Alternatively however, only clock regime A may also be derived directly from the respective local module clock 16-19 while clock regime C is derived from clock regime A. This is described in more detail with reference to FIG. 5. There, a time axis t is plotted in the horizontal direction, the units of which are specified in clock pulses of a local module clock. Clock regimes A and C are started by a module at a certain time, for example clock pulse 0. These two clock regimes A and C differ in terms of their clock frequency. Processes, more particularly calculations, data processing or communication such as the output of control commands, are carried out in all clock regimes. A clock regime B is started after a certain number of clock pulses, 22 clock pulses in this example. This derives from a clock pulse of clock regime A and, once again, has a different clock frequency to the remaining clock regimes. After a certain number of clock pulses, after 123 clock pulses in this example, clock regime C is newly synchronized, for the purposes of which a clock pulse of clock regime B is used. Clock regime C is terminated after a certain number of clock pulses, at the 202nd clock pulse in this example. This may be the case if a process has been worked through or may be set in advance at the start of clock regime C. With its last clock pulse, the termination of clock regime C starts a new clock regime D, which, once again, may have a different frequency to the remaining clock regimes. In the illustrated example, the latter runs to the 321st clock pulse while the clock regime A continues until the 444th clock pulse. The clock of the different clock regimes can be lower or else higher than the local module clock.

Figure 6:
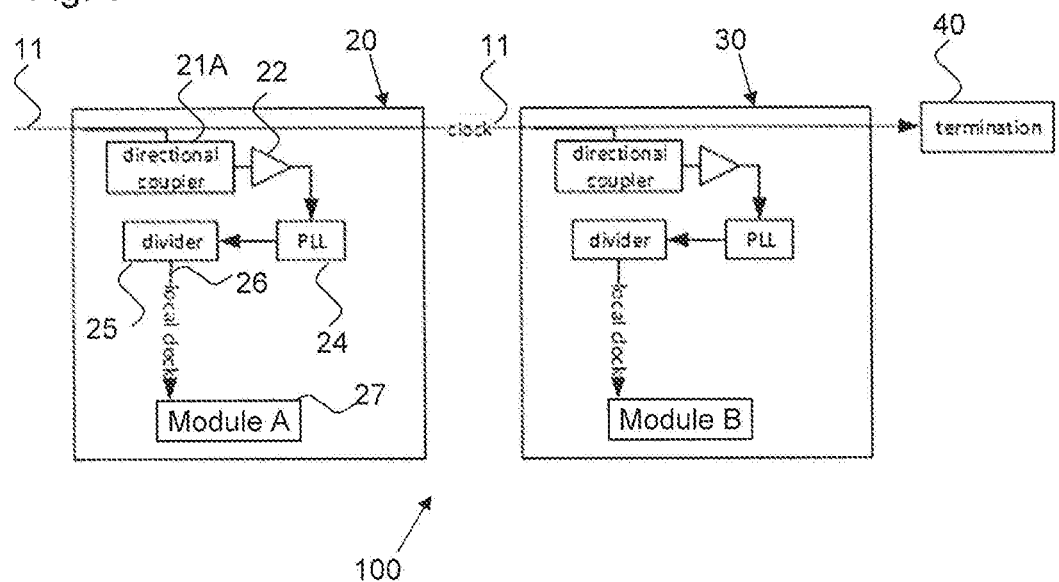
FIG. 6 is a schematic illustration of a further microscope system according to the invention.

An alternative embodiment of a microscope system 100 according to the invention is shown in FIG. 6. The embodiment is similar to the microscope system 100 illustrated in FIG. 2, wherein components with the same function have corresponding reference signs and the explanation provided in relation to FIG. 2 in this respect also applies to the exemplary embodiment of FIG. 6. As a substantial difference in relation to FIG. 2, a clock signal 11 in FIG. 6 is not guided through a microscope module 20 in order to be forwarded to a next microscope module 30. Rather, a line for the clock signal 11 is provided, decoupling to the various microscope modules 20, 30 being implemented from said line in each case. Decoupling from the line into a microscope module 20 can be implemented by a directional coupler 21A of the respective microscope module 20. The directional coupler 21A guides a signal component of the clock signal 11 into the respective microscope module 20 while the non-coupled remaining signal component of the clock signal 11 runs on to the next microscope module 30 without passing through the microscope module 20. As a result of this, time delays as a result of guiding the clock signal 11 are reduced. A signal amplification of the component of the clock signal coupled into the module 20 is implemented here by the amplifier circuit 22 only for the clock signal internally used in the microscope module 20 and not for the component of the clock signal 11 guided to the next microscope module 30. Accordingly, the module 20 does not require a clock input circuit and clock output circuit but can otherwise be designed as described in relation to FIG. 2; in particular, it may have a frequency ascertainment circuit and the remaining components described there.

The line for the clock signal 11 is terminated by a line termination 40 in this embodiment.

In place of a directional coupler 21A, use can also be made of a multi-drop bus or multi-drop topology for guiding the clock signal 11: The clock signal 11 is emitted by the central clock generator 10 and transmitted to a plurality of/all microscope modules 20, 30, 40, 50. Addressing denoting a certain microscope module 20 is encoded into the clock signal 11. Moreover, data linked to the addressing are encoded. The microscope modules 20, 30, 40, 50 receive the clock signal 11 and read the addressing, with only the addressed microscope module 20 processing the encoded data. In this way, a certain microscope module 20, 30, 40, 50 can be actuated in targeted fashion by way of the clock signal 11.

Advantageously, a module can, in form of the clock regime, set suitable clock frequencies for its different components. By referencing the clock regimes with respect to one another, synchronizations are possible in a simple manner and a time relationship between the processes of different clock regimes, known in advance, persists.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

10 Clock generator
11 Clock signal
12 Modulated clock signal
13 Derived clock
14, 15 Signal
16-19 Local module clocks
20 Microscope module
21 Clock input circuit
21A Directional coupler
22 Amplifier circuit
23 Clock output circuit
24 Frequency ascertainment circuit
25 Clock divider circuit
26 Local module clock
27 Components of the module
30, 40, 50 Microscope modules
100 Microscope system
A, B, C, D Clock regimes

What is claimed is:

1. A method for timing procedures in a microscope system,
wherein the microscope system includes a plurality of microscope modules, which are configured to carry out different processes, said method comprising:
providing a clock signal to all of said microscope modules by a central clock generator;
modulating said clock signal by a clock modulation circuit to produce a defined clock-pulse number;
defining a start time by the microscope modules for carrying out a process by way of the clock-pulse number and carrying out the process as soon as the clock-pulse number is reached;
wherein at least one of the microscope modules is configured to form a clock with a different frequency from the received clock signal and using this formed clock as a local module clock.

2. The method as claimed in claim 1,
wherein different microscope modules are configured to form different clocks from the respectively received clock signal and using said clocks as local module clocks, respectively.

3. The method as claimed in claim 1,
wherein at least one of the microscope modules derives different clock regimes, which differ in terms of their clock frequency, from the local module clock, and
carrying out different processes under the different clock regimes by the corresponding microscope module.

4. The method as claimed in claim 1,
wherein different microscope modules work with different local module clocks but derive the same clock regime from the different local module clocks, one or more processes being carried out under said same clock regime by each of the microscope modules.

5. The method as claimed in claim 1,
wherein at least one of the microscope modules derives at least one clock regime, under which it carries out a process, from its local module clock; and
this microscope module derives a clock sub-regime from the clock regime, said microscope module carrying out a further process under said clock sub-regime.

6. The method as claimed in claim 5,
wherein at least one of the microscope modules synchronizes one of its clock sub-regimes with one of its clock regimes after a certain running time.

7. The method as claimed in claim 3,
wherein the at least one microscope module sets times at which various clock regimes are activated and deactivated with the aid of the clock-pulse number contained in the clock signal.

8. A method for timing procedures in a microscope system,
wherein the microscope system includes a plurality of microscope modules, which are configured to carry out different processes, said method comprising:
providing a clock signal to all of said microscope modules by a central clock generator;
modulating said clock signal by a clock modulation circuit to produce a defined clock-pulse number;
defining a start time by the microscope modules for carrying out a process by way of the clock-pulse number and carrying out the process as soon as the clock-pulse number is reached;
wherein the clock modulation circuit modulates a clock signal by virtue of the clock modulation circuit modulating a distance between rising clock pulse edges while leaving a distance between falling clock pulse edges constant; or the clock modulation circuit modulating a distance between falling clock pulse edges while leaving a distance between rising clock pulse edges constant.

9. The method as claimed in claim 1,
wherein the clock modulation circuit modulates a clock signal in order to encode an additional information item;
the microscope modules read the additional information item encoded into the clock signal.

10. A method for timing procedures in a microscope system,
wherein the microscope system includes a plurality of microscope modules, which are configured to carry out different processes, said method comprising:
providing a clock signal to all of said microscope modules by a central clock generator;
modulating said clock signal by a clock modulation circuit to produce a defined clock-pulse number;
defining a start time by the microscope modules for carrying out a process by way of the clock-pulse number and carrying out the process as soon as the clock-pulse number is reached;
wherein at least a first and a second microscope module of the plurality of microscope modules are connected in series such that the central clock generator transmits the clock signal to the first microscope module and the latter passes the clock signal to the second microscope module, as a result of which the first and second microscope modules receive the clock signal with a time offset;
at least one of the first and second microscope modules comprises a data memory in which a predetermined time offset value is stored, the latter serving as a measure for the time offset;
the clock-pulse number received by way of the clock signal is modified by the time offset value by the at least one of the first and second microscope modules in order to take account of the time offset.

11. A microscope system
comprising a plurality of microscope modules, which are configured to carry out different processes;
wherein the microscope system comprises a central clock generator, which is configured to output a clock signal to the microscope modules;
the microscope system comprises a clock modulation circuit, which is configured to modulate the clock signal for producing a defined clock-pulse number;
the microscope modules are configured to define a start time for carrying out a process by way of the clock-pulse number and carry out the process as soon as the clock-pulse number is reached;
wherein the clock modulation circuit is configured to modulate a clock signal in order to encode an additional information item;
the microscope modules are configured to read the additional information item encoded into the clock signal.

12. The microscope system as claimed in claim 11,
wherein at least some of the microscope modules are chosen from the following group of microscope modules:
a laser scanning module,
a spectrometer module,
a multiphoton examination module,
a filter control module,
an image recording module,
a light source module,
a visualization module.

* * * * *